(12) United States Patent
Weber et al.

(10) Patent No.: US 6,313,440 B1
(45) Date of Patent: Nov. 6, 2001

(54) HOT PLATE WELDING SYSTEM

(75) Inventors: Wolfgang Weber, Leamington (CA); Hans-Josef Oxenfarth, Ennepetal (DE)

(73) Assignee: KVT Technologies Inc., Oldcastle (CA)

( * ) Notice: Subject to any disclaimer, the term of this patent is extended or adjusted under 35 U.S.C. 154(b) by 0 days.

(21) Appl. No.: 09/646,614
(22) PCT Filed: Mar. 23, 1999
(86) PCT No.: PCT/CA99/00251
 § 371 Date: Nov. 13, 2000
 § 102(e) Date: Nov. 13, 2000
(87) PCT Pub. No.: WO99/50049
 PCT Pub. Date: Oct. 7, 1999

(30) Foreign Application Priority Data

Sep. 27, 1998 (DE) .............................................. 198 13 766

(51) Int. Cl.[7] ...................................................... H05B 1/00
(52) U.S. Cl. .............................................................. 219/243
(58) Field of Search .................................... 219/221, 243, 219/85.16, 85.19; 136/499, 273.7, 309.9; 100/92, 375

(56) References Cited

U.S. PATENT DOCUMENTS

| | | | |
|---|---|---|---|
| 3,897,296 | * 7/1975 | Waldrum | 156/304.2 |
| 3,971,875 | * 7/1976 | Regalbuto | 219/243 |
| 4,957,570 | 9/1990 | Jenkins et al. | |
| 5,451,288 | * 9/1995 | Smith et al. | 156/359 |
| 5,527,406 | 6/1996 | Brath | |
| 5,614,118 | 3/1997 | Weber | |

FOREIGN PATENT DOCUMENTS

| | | |
|---|---|---|
| 3537670 A1 | 4/1987 | (DE) . |
| 19536857 A1 | 3/1995 | (DE) . |
| 195 06 236 | 8/1996 | (DE) . |
| 0 027 225 A1 | 4/1980 | (EP) . |
| 0 196 795 2 | 6/1986 | (EP) . |
| 0 653 288 A2 | 10/1994 | (EP) . |
| PCT/EP95/04469 | 5/1996 | (EP) . |

OTHER PUBLICATIONS

Patent Abstract of Japan vol. 017, No. 022 (M–1348), Jan. 5, 1993 & JP 04 234633 A (Oosaka Suikou KK), Aug. 24, 1992.

Patent Abstract of Japan vol. 096, No. 009, Sep. 30, 1996 & JP 08 112861 A (Nakajima Doukou KK), May 7, 1996.

* cited by examiner

*Primary Examiner*—Teresa Walberg
*Assistant Examiner*—Vinod D. Patel
(74) *Attorney, Agent, or Firm*—Riches, McKenzie & Herbert

(57) ABSTRACT

The invention disclosed hereunder is a process and a device for the preparation and formation of a plastic weld connection between a workpiece (13) and a second component to be attached thereto by heating by means of a heating device (12). If force is applied, the heating element (12) tends to deform the contact surface especially in the case of hollow, thin-walled workpieces such as plastic containers. So far, methods were disclosed for the measuring of the degree of deformation by means of a sensor, subsequently readjusting the position of the heating device according to the determined deformation. The invention disclosed here under dispenses with any measurement of deformation, instead using an elastic element which automatically readjusts the position of the heating element (12) in the case of deformation of the workpiece (13) to effect a pre-load between the heating device (12) positioned at the contact surface of the work-piece (13) and the workpiece (13).

24 Claims, 3 Drawing Sheets

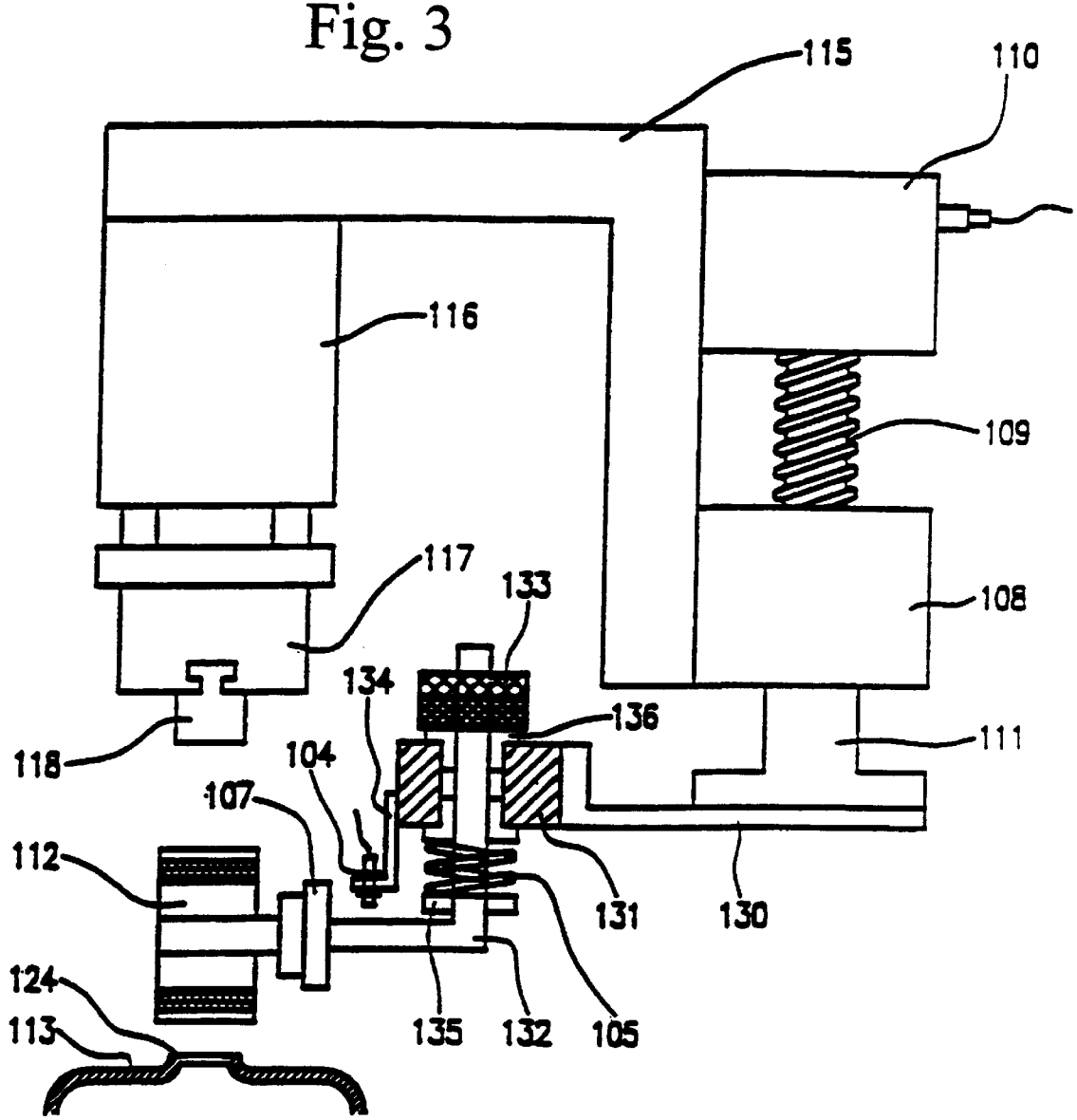

HOT PLATE WELDING SYSTEM

SCOPE OF THE INVENTION

The present invention relates to a method and apparatus used to prepare and form weld connections between thin walled articles which may in themselves be subject to distortion or deformation when subjected to critical pressures or loading. The method more preferably involves the softening of the contact surface of the workpiece by means of a heat applying application device which is moved into engagement with the contact surface of the workpiece.

BACKGROUND OF THE INVENTION

When two components are connected by means of bonding, gluing or welding, the elasticity of the components, namely their ability to bend or yield to pressure, often constitutes a significant problem in terms of the quality of the connection. The quality and integrity of the connection can be reduced, particularly in the case of extrusion-blown hollow plastic bodies, due to the inconstant positioning of one of the components during the melting and pressing process. Leaky weld connections can lead to serious consequences in the context of applications where weld connections of a high quality are required, as for example in the manufacture of plastic fuel tanks which require high tolerance limits as far as the location of the connecting surfaces is concerned. In the context of such applications, the compensation of tolerance limits for the positioning of the contact surfaces with help of a welding system is required.

German Patent No. DE 35 37 670 C2 to Oxenfarth, which issued on Mar. 3, 1988, discloses a conventional process and corresponding device for use in forming a plastic weld connection. A minimum-force sensor mechanically determines the position of the contact surface on a workpiece such as a hollow plastic container (e.g. a fuel tank of a vehicle). Once the workpiece position is determined, a welding head or other heat applying device is moved by the sensed distance into contact with the workpiece to soften and melt a portion to which a second component is to be welded. This process assures safe welding of the second component, which for example may be a vent connection or filler neck onto the workpiece in spite of high tolerance limits as far as the dimensions of the workpiece are concerned. Therefore, the use of thicker materials to ensure complete welds, and which is almost impossible in the case of thin-walled hollow bodies, is not required to effect the connection. This procedure, however, neglects the forces that melting head apply to the workpiece and which can cause distortion or bending of workpiece surfaces, leading to incomplete welds.

DE-PS 39 22 066 discloses a further development of the state of the art used to achieve improved welds. This reference discloses a method to compensate for position changes and deformation of the part of a workpiece to which a second component is to be connected by readjusting the position and contact pressure of a heating element, as well as the position and contact pressure of the second component to be connected to the workpiece. For this purpose, the position of the contact surface on the workpiece is also determined by a minimum-force mechanical sensor. The result of the measuring process is then used to readjust a piston which presses the component to be added against the heating device and the heating device against the workpiece.

Published Japanese Patent Abstract No. 04 234633 to Yokoyama Takahito (published Aug. 24, 1992) discloses a holder used to position a polyethylene joint on a tank, following melting and heating of contact surfaces. The holder includes a compression spring used to bias a melted surface of the joint against a melted surface of the tank.

Published Japanese Patent Abstract No. 08 112861 to Imagawa Kanji (published May 7, 1996) discloses a heating device used to heat weld together two sheets. The heating device includes a heating part which is biased by means of a spring to project downwardly through an opening, into contact with the sheets which are to be welded.

The determination of the position of the workpiece surface using an additional sensing device constitutes a disadvantage in that it is not sufficiently accurate, as the method requires the establishment of additional reference surfaces on a potentially elastically deformable surface of the workpiece or component. In addition, the reference surfaces are often not feasible for manufacturing related reasons, or are located too far from the relevant connecting position, thus distorting the result.

Plastic welding units that are exclusively equipped with load-sensitive sensors such as load cells can compensate for the disadvantages of external sensing equipment but are often expensive and are not sufficiently sensitive for design-related reasons. Additionally, the impression depth achieved by the partial melting of the component or workpiece surface is not adequately determined.

SUMMARY OF THE INVENTION

The invention is therefore based on the need to develop an improved device and a process for the formation of weld connections of constant quality as between a workpiece and a second component which is to be connected thereto. More preferably, the present invention seeks to achieve the formation of high quality plastic weld connections where either the workpiece and/or the component may be elastically deformable upon the application of a predetermined minimum force thereto.

The inventor has appreciated an improved method of forming a plastic weld connection between a workpiece which can be shaped or deformed by application of mechanical force and a second component to be connected thereto. The method preferably involves the softening of the contact surface of the workpiece by application of heat, however, other means of joining components to the workpiece, such as gluing, sonic welding or the like are also possible. The process broadly comprises the steps of positioning of an application device adapted to melt, glue or weld the contact surface of the workpiece, activating the application device to prepare the contact portion of the workpiece while repositioning of the application device in relation to the workpiece during preparation of the contact portion. The method is further characterized by the fact that the repositioning comprises a defined displacement of the application device in relation to the contact surface of the workpiece, and which is independent of a determination of the position by means of measuring.

The present invention also overcomes the disadvantages of the prior art by providing a device for the preparation and formation of a weld connection between a workpiece which can be distorted or deformed upon the application of predetermined mechanical force and a second component which is to be connected thereto. The apparatus preferably includes a hot plate used in the softening or partial melting of the contact surface of the workpiece when applied thereto. The apparatus is characterized by the fact that it is adapted to reposition the hot plate during melting without measuring of the position of the contact surface, and most preferably during displacement of the hot plate while it is applied to the contact surface of the workpiece as deformation and melting of the contact surface occurs.

The invention preferably relates to a process for the preparation and formation of a plastic weld connection between a deformable thermoplastic workpiece which may be distorted by the application of a mechanical force and a second thermoplastic component to be connected thereto. In a preferred embodiment, the method includes a step of softening or partial melting of the contact surface of the workpiece by application of heat. More preferably, the process includes the following steps: positioning a heat applying device at the contact surface, activating the heat applying device, and continuously repositioning the heat applying device in relation to the workpiece during the softening of the workpiece.

Additionally, the present invention relates generally to a plastic welding device for the preparation and formation of a weld connection between a workpiece and a second component to be connected thereto.

The process and the device disclosed hereafter ensure that the load forces of the element used in preparing or performing the welding process is directly applied to the elastic component to be connected to the workpiece, and applies a defined load and maintains a defined path during welding operations.

The basic principle of the present invention and process disclosed also compensates for different degrees of bending or flexure due to production-related differences in workpiece wall thickness, aging or variations in material quality. Basically, the principle of the device disclosed hereunder is suitable for all processes where a workpiece having an elastically deformable surface must be prepared under path-dependent and load-dependent conditions.

The preferred field of application, however, is for use in formation of plastic weld connections where the contact surfaces of the two components to be joined are softened by heating and pressed together in a defined fashion while still soft and partially melted. The pressing phase is followed by a cooling phase that allows the softened material to harden to form a finished weld. By way of non-limiting examples, the present invention may be used to weld components such as thermoplastic vent nipples, filler necks or the like to blow moulded thermoplastic workpieces, such as automotive gas tanks, fluid reservoirs or any other plastic parts which may require welding.

According to the present invention, a pneumatically, hydraulically or electrically operated advancing system is preferably used to press a heating element, which is controlled via a load-sensitive element attached to the advancing device into contact with a partially elastic contact surface. The mobility of the load-sensitive element should preferably be limited to a translational one-dimensional motion. with the preferred design allowing for adjustment of an admissible maximum path. More preferably, the heating element is also equipped with a load-sensitive sensor.

Through the load-sensitive sensor, the heating element can be pressed onto the elastic contact surface until a predefined load value is reached. As soon as the predefined contact pressure is reached, the load-sensitive sensor operates to cease operation of the advancing system and the further movement of the heating element.

To achieve production-related even and homogeneous softening in the area of the contact surface, the heating element is preferably advanced a minimum impression depth into the melting material at the contact surface. The minimum impression depth of the heating element being defined as the maximum local shape or thickness at the contact surface and position tolerance required to compensate for any irregularities of the contact surface.

The predefined distance of movement of the load-sensitive element determines the impression depth. As soon as the maximum impression depth is reached, the heating element engages the contact surface without any further force being applied so as to ensure sufficient radiation and penetration of heat and, thus a sufficient amount of softened material for the subsequent connecting process. Depending on the requirements of the application, the maximum impression depth can be monitored by a signal transmitter.

The load-sensitive mechanism ensures that reproducible impression depth and heating of the contact surface are achieved by simple mechanism, regardless of the elastic bending of the contact surface. An accurate relation between the heating element and the contact surface is given at any moment, as the heating element directly performs the function of a position sensor. The system disclosed hereunder is free of the disadvantages which are characteristic of systems that use position sensors and reference surfaces which, for production-related reasons, must be located at a certain distance from the contact surface.

The process disclosed hereunder does not in principle require the contact surface to be additionally pre-loaded or biased against the heating element. This may be done, however, for economic reasons, because higher contact pressures applied to compensate for irregularities, while the heating element advances into the material, allow a significant reduction of production cycle times.

The load-sensitive sensor should preferably be an adjustable device, thus ensuring that the contact pressure required for different production processes and workpieces can be defined. The load-sensitive sensor may also be designed in the form of a load cell, thus ensuring that the documentation and recordal of the load parameters during the process is possible.

Depending on the counter forces originating from the deformation of the contact surface, the load-sensitive element can be provided with a path limitation feature such as a stop. Thus it is possible to ensure that the heating element advances into the material exerting a relatively great force and within a correspondingly short time. As the contact surface approaches the path limitation point, the external forces decrease towards zero and the heat can penetrate from the heating element into the material, substantially without any further forces being applied. In contrast to other prior art hot welding systems, it is not necessary to remove the load of the heating element from the deformed contact surface during the heating process.

The separate pressing or advancing mechanism required to connect the components to each other can be designed as desired, however, pneumatically, hydraulically or electrically operated systems are preferred and will become readily apparent.

Although not essential, the softening of the component to be attached to the workpiece should preferably be affected by means of the same heating element used to soften the elastic workpiece proper, using the surface of the heating element opposite from the elastic workpiece.

Path limitation and load measuring systems can be used to compensate for tolerances regarding the contact surfaces or for irregularities of the component to be attached to the original workpiece. Considering the fact that the system disclosed hereafter can also be used for components with deflection-resistant surfaces, it is recommended to use a load-sensitive mechanism according to the present invention to support the component to be attached to the workpiece.

The present invention compensates for manufacturing irregularities and height tolerances in the area of the contact surface, at the same time ensuring that the heating element advances to sufficiently deep level into an irregular contact surface, without requiring external path measuring or continuous control devices and without additional reference surfaces in the vicinity of the elastic contact surface.

In a process for the preparation or heating of an elastic contact surface, heating, is effected by a heating element that is connected to an advancing mechanism via a sensing element. The advancing mechanism preferably consists of a self-locking threaded spindle with an adequate driving mechanism.

A particular advantage of the present invention resides in the fact that the adjustment of the loads exerted during the warming and the heat diffusion stage, the registration of the location of the elastic contact surface, and the determination as well as the limitation of the path traveled by the heating element during the warming stage can be effected by one single device. Additionally, this device performs all required movements.

Accordingly, in one aspect the present invention resides in a device for the preparation and formation of a weld connection between a workpiece and a second component to be connected thereto, and including means for the softening of the contact surface of the workpiece by applying an application device to the contact surface of the workpiece, characterized in that the device includes means for repositioning the application device without measuring of the position of the contact surface, and means for displacing the application device applied to the contact surface of the workpiece in relation to the workpiece as soon as deformation of the contact surface occurs.

BRIEF DESCRIPTION OF THE DRAWINGS

Reference may now be had to the following detailed description taken together with the accompanying drawings in which:

FIG. 3 is a side view of a second embodiment of the present invention

DETAILED DESCRIPTION OF THE PREFERRED EMBODIMENTS

Figure 1:
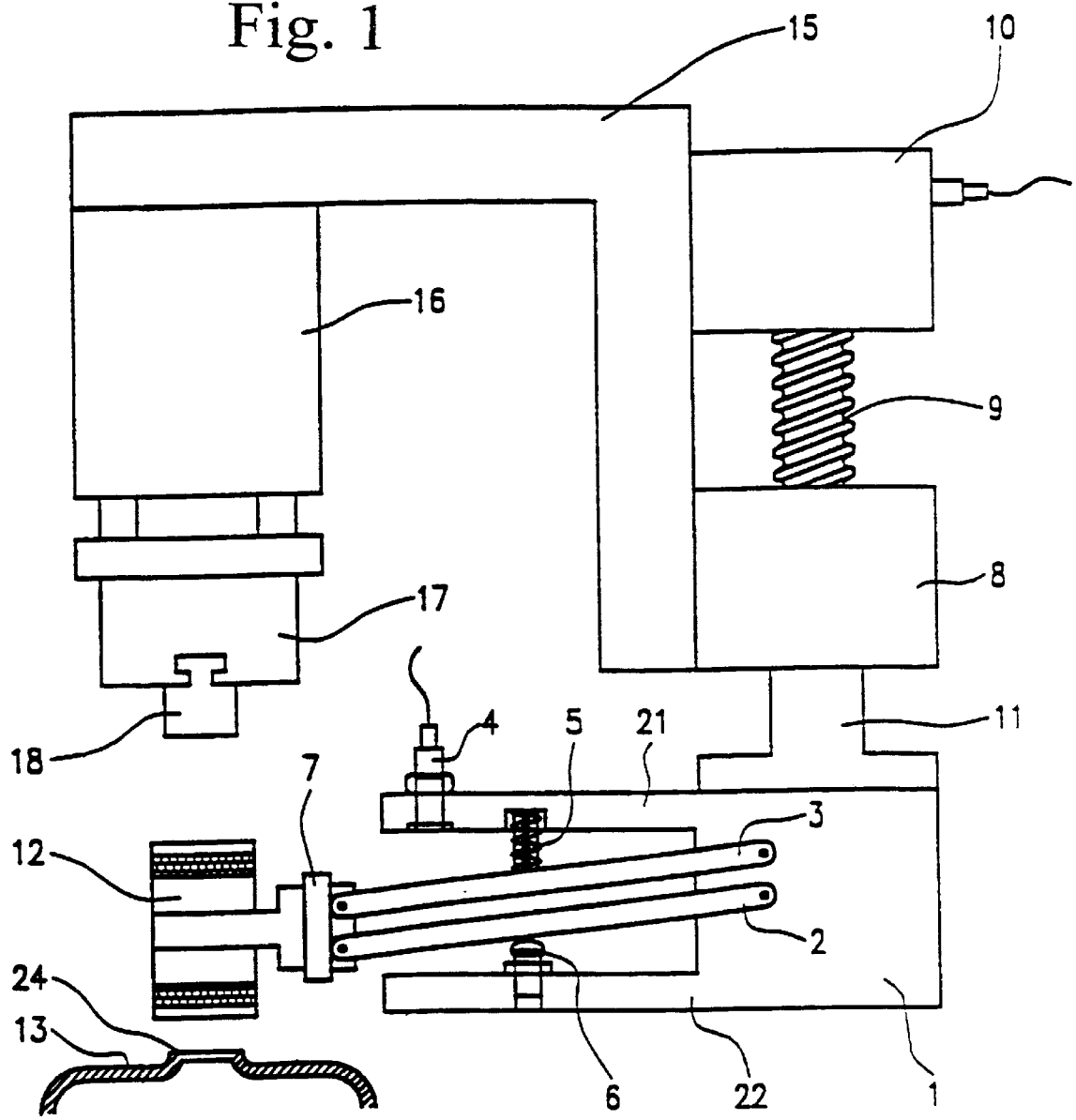
FIG. 1: is a side view of a first embodiment of the present invention.

The device shown in FIG. 1 comprises a base unit 1. Two articulating arms or rods 2 and 3 are pivotally attached at one end to base unit 1, with the other ends of the arms 2,3 articulated with an adapter plate 7, and the arms 2,3 together forming a parallelogram. Due to this design, the adapter plate 7 can practically move in only one direction (in FIG. 1 along the vertical axis). The second (horizontal) component of movement present in this system is insignificantly small, provided that the components are arranged accordingly, and can thus be neglected. It is to be appreciated, however, that instead of arranging the two arms 2,3 to form a parallelogram, it would also be possible to attach the adapter plate 7 to only one arm that glides up and down in a guiding device on the base unit 1. This design requires a greater effort to mount the arm in a guiding device on the base unit 1 but offers the advantage of more complete elimination of the horizontal component of movement.

The base unit 1 comprises two fork-like extensions 21 and 22 between which the arms 2 and 3 are located. A spring 5 which acts on arm 3 is attached to extension 21, pre-loading a arm 3 at a distance from the other extension 22 of the base unit. A mechanical path limitation device 6 is attached to the second extension 22 of the base unit Thus the maximum movement of arm 3, which can be triggered by the force of spring 5 acting on arm 2, which in turn is coupled with arm 3 via the base unit I and the adapter plate 7, is limited.

The mounting positions of arms 2 and 3 on the base unit 1 and the position of the multi-purpose spring 5 create a lever system, the advantages of which will be discussed below. The adapter plate 7 holds a heating device 12. This heating device 12 can be designed as required on the desired application The base unit 1 is connected to an adjusting element, e.g. a feed bar 11. Feed bar 11 is connected to a drive unit 10, e.g. a motor, via a converter unit 8 and a threaded spindle 9.

The motor 10 as well as the converter unit 8 is attached to one side of an angular supporting element 15. The other side of the supporting unit 15 carries an advancing unit 16 as for example is of the type disclosed in U.S. Pat. No. 5,614,118 to Weber, which issued Mar. 25, 1997. The end of the advancing unit 16 is provided with a component holding device 17 which carries a second thermoplastic component 18 to be attached to the contact surface 24 of a thermoplastic workpiece 13.

The converter unit 8 converts the rotational movement transmitted via the threaded spindle 9 into a translational motion, at times allowing for a superimposed rotational movement When the drive 10 is operated and rotates in the correct direction, the feed bar 11 performs a combined translational movement (e.g. in FIG. 1 a sliding movement in the vertical direction) and swiveling movement (e.g. 90°). The base unit 1 is moved from its basic position spaced above the workpiece 13 into the working position shown in FIG. 1. In this working position, the centers of a contact surface 24 on the workpiece 13 and the center of the heating element 12 are aligned. The converting unit 8 is appropriately designed to ensure, as soon as the centers of the heating element and the contact surface are aligned, that the base unit 1 performs only a translational movement (vertical downward movement) transmitted by the drive shaft As the base unit 1 is lowered relative the workpiece, as soon as the heating element 12 touches the elastic contact surface 24, the multi-purpose spring 5 is compressed until arm 3 engages extension 21 of the base unit 1, thus triggering a sensor 4 mounted on the end of arm 3.

The spring force of the multi-purpose spring 5 is selected depending on the elasticity of the contact surface 24. The multi-purpose spring 5 should preferably be a spring with adjustable spring force and combined with a load sensor or a load cell. In addition to regulating the sensitivity of sensor 4, the multi-purpose spring 5 serves to compensate for the dead weight of the lever system depending on the position in which the entire system is installed.

Triggering of sensor 4 immediately stops the drive 10. The self-locking effect of the threaded spindle 9 helps to stabilize the position of the base unit 1, maintaining it in an accurate spaced relation to the contact surface 24. Thus it is ensured that the heating element 12 always stays in contact with the contact surface 24 independently of the height tolerance of the contact surface 24.

The force applied by the compressed multi-purpose spring 5 and the restoring force of the contact surface 24 press the heating element into the contact surface 24. The adjustable mechanical path limitation device 6 allows the impression depth of the heating element 12 to be limited to a threshold which can be defined depending on the material of the workpiece, and in a preferred embodiment used in gas tank manufacture should amount to approximately 2 mm. The heating element 12 now rests on the contact surface 24 substantially without exerting any further force, and the heat of the heating element 12 can now penetrate into the supporting surface 24 practically without displacing any further material.

The mechanical path limitation device 6 can also be equipped with a sensor. In this case, compliance with the defined impression depth upon the return of the arm 2 into contact with the device 6 can be verified and documented.

Figure 2:
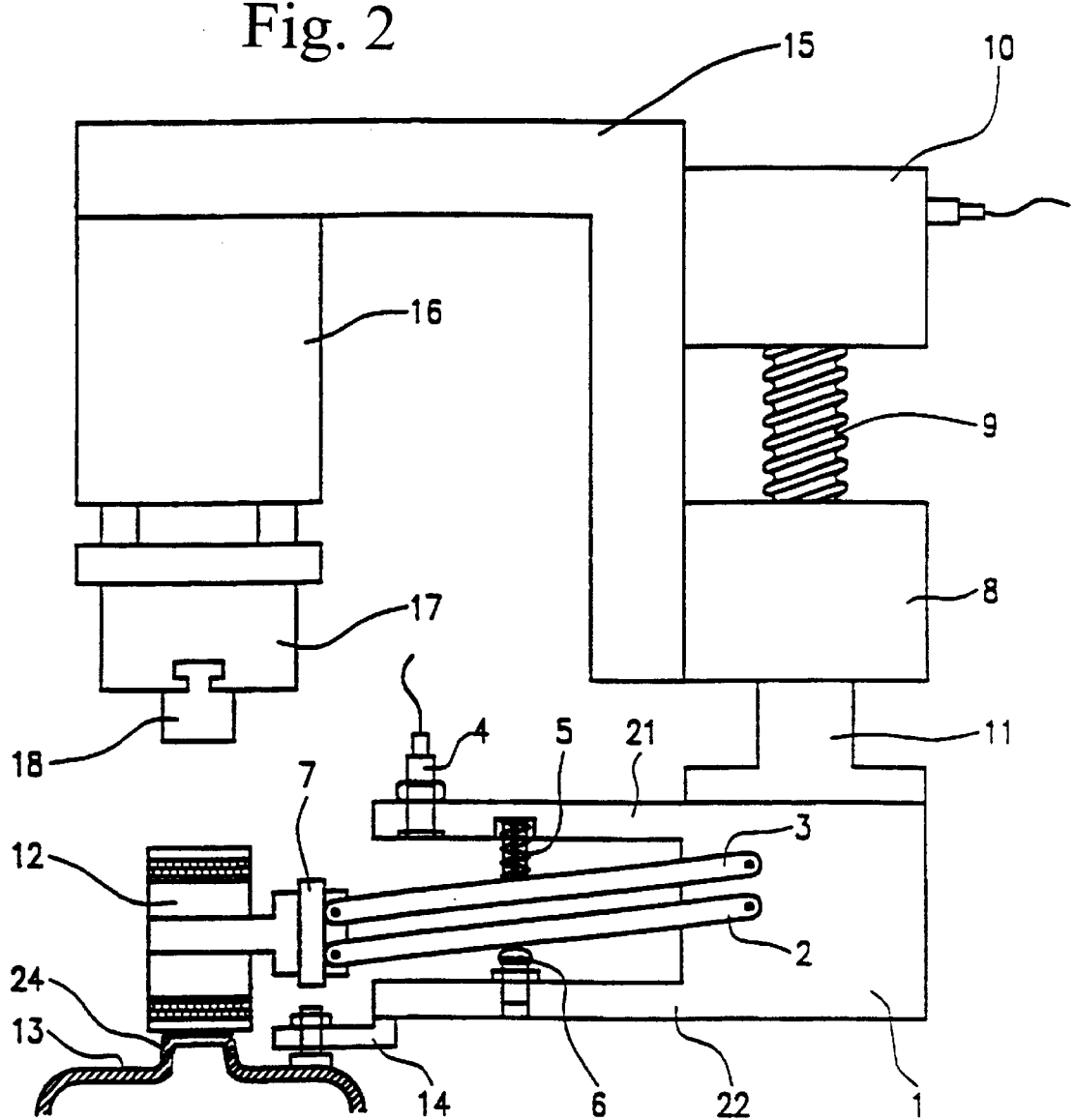
FIG. 2 is a side view of a modified form of the invention of FIG. 1.

FIG. 2 shows a modified form of device shown in FIG. 1 used to effect welding operations while maintaining the workpiece 13 in a deformed state. In FIG. 2, like reference numerals are used to identify like components. If the elastic return of the contact surface 24 from a deformed state as a result of applied downward force of the heating element 12 during the warming phase is not desired for production-related reasons, the return of the contact surface 24 to an undeformed configuration may be prevented by the use of a mechanical path limitation system 14 mounted on the base unit 1. The mechanical path limitation system 14 should be mounted in the vicinity of the contact surface 24 at a point where the plastic will not be softened and where it will be triggered prior to the path limitation system 6.

In operation of either the device shown in FIG. I or the modified version of FIG. 2, during the heating of the contact surface 24, the contact surface of the second component 18 should for practical reasons be simultaneously heated by the end of the heating element 12 opposite the contact surface 24. This process can be effected by any desired component holding device 17 and an advancing unit 16 connected thereto, as for example is disclosed in U.S. Pat. No. 5,614,118, and which is connected with the device of the present invention via a supporting element 15.

After arrival at the mechanical stop limitation 6 (shown in FIG. 2) and a subsequent waiting period required to let the heat of the heating element 12 penetrate the contact surface 24, the drive 10 is next operated in the opposite direction to raise the heating element 12 from the workpiece 13. It is to be appreciated that the drive 10 must not be activated before the heating process of the second component 18 is completed and the advancing unit 16 has returned to its basic position retracted above the contact surface 24.

With the activation of the drive 10 in the opposite direction, the heating element 12 is raised from the contact surface 24 (lifted off vertically) and swiveled out of the working zone by a superimposed rotational movement. Then the advancing device 16 lowers and presses the melted portion of the second component 18 onto the melted contact surface 24 of the workpiece 13.

FIG. 3 shows a side view of the second embodiment of the invention. Identical or similar features in FIG. 3 are allocated the same numbering as a FIG. 1, each number being augmented by a value of 100. For a description and explanation of the functions of identical or similar components please refer to the description of the first design according to FIG. 1.

In the device designed as illustrated in FIG. 3, an angular holding device 130 is mounted at the end of the feed bar 111. The free end of this holding device is provided with a holding ring 131. In the central opening of the holding ring 131, one leg of an angular supporting rod 132 slides up and down on a pair of bearing bushes 136. The angular rod 132 is provided with a collar 135 which supports a compressible spiral spring 105 which coils around the leg of the angular rod 132 and exerts its pressure against a bearing bush 136. The end of the angular rod opposite from the spring 105 is provided with a stop 133. The free leg of the angular rod 132, forming an angle of 90° with the first leg, carries an adapter plate 107 at its free end. The holding ring 131 is provided with a holding element 134 that suspends the sensor 104 in the vicinity of the free leg of the angular rod 132 in the area where the latter performs its translational movement.

This second design works similarly to the first design. When the motor 110 is activated, the feed bar 111 rotates horizontally through an angle of 90° from the basic position (not shown in the drawing) into the working position shown in FIG. 3. In this position, the heating device 112 is located between and vertically aligned with the contact surface 124 and the second component 118. As the motor continues to work, the feed bar 111 performs a translational movement lowering vertically with the heating element 112 being pressed against the contact surface 124. As the drive 110 continues to work, the restoring force of the workpiece 113 at the contact surface 124 acts against the heating element 112 and compresses the spring 105. Finally the drive 110 is stopped as the horizontal arm of the angular rod 132 engages and triggers the sensor 104. The position of the heating device 112 is now stabilized due to the self-locking effect of the spindle 109. The workpiece 113 is deformed at the contact surface 124 due to its contact with element 112 and the elastic force of the compressed spring 105. Due to the force of the compressed spring 105 and the restoring force of the deformed contact surface 124, the heating device 112 moves inwardly relative to the contact surface 124 displacing the material of the workpiece 113 as it begins to melt. The melting depth can be limited by the adjustable stop 133, e.g. to a value of 2 mm. As soon as the stop 133 is in contact with the bearing bush 136, heat from the heating device 112 penetrates the material of the workpiece 113 at the contact surface 124 without further force being exerted or further melted material being displaced.

While the contact surface 124 is heated, the second component 118 is positioned by the advancing unit 116 on the side of the heating device 112 opposite from the contact surface 124 and simultaneously heated. As soon as a sufficient amount of time for the heating and melting of the contact surface 124 and the second component 118 has passed, the advancing unit 116 raises the second component 118, and the drive is reactivated in the opposite direction to lift the heating element 112 off the contact surface 124 and to swivel it, at the end of its path of translational (e.g. vertical) movement, by an angle of 90° out of the working position back into the basic position. Then the advancing unit 116 alone lowers and presses the still hot and softened surface of the second component 118 against the still hot and softened contact surface 124 of the workpiece 113 to weld the component 118 to the workpiece 113. After cooling of the plastic weld connection, a durable, strong and excellent leak-proof connection is achieved.

Both designs illustrated in FIG. 1 and FIG. 3 would allow the workpiece to be elastically or resiliently supported (e.g. on a spring device) and to be moved so as to achieve an initial tension between the heating element and the workpiece.

For the designs described above, only the creation of a plastic weld connection by heating and softening the material of both the workpiece and the component to be attached thereto has been assumed. The expert, however, is aware that the invention disclosed hereunder can also be used for applications where the softening of the workpiece is not achieved by heating but through chemical treatment, glue, and/or sonic welding either with or without pressing the second component supported by an elastic device against the workpiece (or vice versa).

While the invention describes and illustrates preferred embodiments of the invention, it is to be appreciated that the invention is not so limited. Other modifications and variations will now become apparent to a person skilled in the art. For a definition of the invention, reference may be had to the appended claims.

We claim:

1. A process for using a device to form a plastic weld connection between a contact surface of a workpiece that can be deformed by application of a predetermined mechanical force and a component to be connected thereto, the device including a heating device for softening the contact surface of the workpiece, and a heater holding device movably supporting the heating device at a desired preloaded position relative to the contact surface wherein the heating device applies a preloading force on the workpiece which is generally less than the predetermined mechanical force, the heating device including a sensor (4,104) activatable to stop movement of the heater holding device when the heating device has achieved the preloaded position without measuring of the position of the contact surface, and a repositioning mechanism for repositioning the heating device relative to the workpiece upon initial softening of the contact surface by the heating device, the process comprising the following steps:

positioning the heating device in initial engagement with the contact surface, moving the heater holding device relative the workpiece while maintaining engagement between the heating device and the contact surface to preload the heating device and activate the sensor, while the heating device softens the contact surface, repositioning the heating device in relation to the workpiece by means of the repositioning mechanism, and wherein the repositioning comprises a defined displacement of the heating device in relation to the contact surface of the workpiece without measuring of the position of the contact surface.

2. The process according to claim 1, wherein the heating device is preloaded by moving the heater holding device against the bias of a resilient spring.

3. The process according to claim 1, characterized in that the preloading force is limited to a maximum value.

4. The process according to claim 1, characterized in that the preloading force is created by an elastically deformable element coupled with the heater holding device.

5. The process according to claim 4, characterized in that the limitation of the preloading force to a maximum value is effected by means of the sensor, and wherein the sensor is triggered upon a predetermined degree of deformation of the elastically deformable element.

6. The process according to claim 1, characterized in that the component is prepared for connecting to the contact surface by heating through the heating device simultaneously while the contact surface of the workpiece is prepared by heating through a heating device.

7. The process according to claim 6, characterized in that a second preloading force acting between the component and the heating device is effected, thus ensuring that the position of the component is readjusted in relation to the heating element while the component is deformed through application of heat by the heating element.

8. The process according to claim 1, characterized in that the repositioning of the heating device is limited to a predetermined distance.

9. A device for the preparation and formation of a weld connection between a workpiece that can be deformed by the application of a predetermined mechanical force and a component to be connected thereto, the device including a heating device for the softening of a contact surface of the workpiece, and a heater holding device movably supporting the heating device in movement into engagement with the contact surface, characterized in that the heater holding device movably supports the heating device at a desired position relative to the contact surface without measuring of the position of the contact surface, the device further including a sensor activatable to stop movement of the heating device when the heating device has been moved to a preloaded position wherein the heating device applies a preloading force on the workpiece which is generally less than the predetermined mechanical force, and a repositioning mechanism for repositioning the heating device relative to the workpiece upon initial softening of the contact surface by the heating device.

10. The device according to claim 9, further including a biasing element for preloading the heating device, the biasing element biasing the heater holding device to readjust the position of the heating device relative to the contact surface without measuring the position of contact surface.

11. The device according to claim 10, characterized in that the heater holding device includes a pair of elongated arm members.

12. The device according to claim 11, characterized in that the biasing element acts on at least one of the arm members, the heating device being mounted towards one end of said arm members whereby the biasing element provides leverage forces to assist in the repositioning of the heating device.

13. The device according to claim 10, characterized in that the positioning device comprises two parallel arms which are pivotally attached to one side of a base unit and on the other side with the heating device for movement substantially in only one direction.

14. The device according to claim 11, characterized in that repositioning of the heating device is limited to a certain distance by means of a stop which limits the movement of the arm member.

15. The device according to claim 9, characterized in that a path limitation device is used to limit the repositioning of the heating device in relation to the workpiece to a predetermined distance.

16. The device according to claim 15, characterized in that a component holding apparatus for the component is provided.

17. The device according to claim 16, characterized in that an adjusting mechanism is used to effect transverse movement of the component holding apparatus for the component in a direction in which the heating device can be readjusted.

18. The device according to claim 17, characterized in that the component holding apparatus readjusts the position of the component in relation to the heating device in the case of deformation.

19. The device according to claim 11, characterized by a threaded spindle drive provided for sliding and/or rotational movement of the heater holding device.

20. The device according to claim 19, characterized in that the threaded spindle drive comprises a self-locking feature.

21. The device according to claim 9, characterized in that the heater holding device comprises a pair of substantially parallel arm members, a biasing element acts on at least one of a pair of arm members, the heating device being mounted towards one end of said arm members whereby the biasing element provides leverage forces to said at least one arm member to assist in the repositioning of the heating device.

22. The device according to claim 21, characterized in that the base unit is movable both in a direction along an axis substantially parallel to a direction of movement the arm members, as well as radially about said axis.

23. The device according to claim 9, characterized in that the heater holding device is mounted on a base unit for linear movement in one direction.

24. The device according to claim 9, characterized in that the heater holding device comprises a heater supporting element which is resiliently biased to a predetermined position via an elastically deformable element.

* * * * *